(12) United States Patent
Kashima et al.

(10) Patent No.: US 6,504,589 B1
(45) Date of Patent: Jan. 7, 2003

(54) BACKLIGHT DEVICE AND LIQUID CRYSTAL DISPLAY DEVICE

(75) Inventors: Keiji Kashima, Tokyo (JP); Fumihiro Arakawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/024,984

(22) Filed: Feb. 17, 1998

(30) Foreign Application Priority Data

Feb. 18, 1997 (JP) .............................................. 09-48563
Jul. 28, 1997 (JP) ........................................... 09-215464

(51) Int. Cl.[7] .......................................... G02F 1/1335
(52) U.S. Cl. .......................................... 349/96; 349/65
(58) Field of Search .............................. 349/9, 98, 115, 349/71, 65, 96

(56) References Cited

U.S. PATENT DOCUMENTS

| | | | |
|---|---|---|---|
| 5,418,631 A | * 5/1995 | Tedesco | 349/176 |
| 5,422,756 A | * 6/1995 | Weber | 359/487 |
| 5,594,830 A | * 1/1997 | Winston | 385/129 |
| 5,712,694 A | * 1/1998 | Taira et al. | 349/9 |
| 5,731,886 A | * 3/1998 | Taber et al. | 359/499 |
| 5,737,044 A | * 4/1998 | Van Haaren et al. | 349/91 |
| 5,808,794 A | * 9/1998 | Weber et al. | 359/487 |
| 5,810,464 A | * 9/1998 | Ishikawa et al. | 362/31 |
| 5,831,698 A | * 11/1998 | Depp et al. | 349/64 |
| 5,877,824 A | * 3/1999 | Sarayedine | 349/8 |
| 6,025,897 A | * 2/2000 | Weber et al. | 349/96 |

FOREIGN PATENT DOCUMENTS

| | | |
|---|---|---|
| JP | 03-75705 | 3/1991 |
| JP | 04-184429 | 7/1992 |
| JP | 06-265892 | 9/1994 |
| JP | 07-261122 | 10/1995 |

OTHER PUBLICATIONS

Robert Maurer et al., 7.6: Polarizing Color filters Made From Cholesteric LC Silicones, SID 90 Digest, 1990, pp. 110–113.

* cited by examiner

Primary Examiner—Kenneth Parker
(74) Attorney, Agent, or Firm—Morgan, Lewis & Bockius LLP

(57) ABSTRACT

A backlight device including a light source for emitting light, a light guide for receiving the light from the light source and for emitting directional light having a maximum intensity in a first predetermined direction, a polarization light splitter having a planar, multi-layer structure; and a beam deflector, disposed between the light guide and the polarization light splitter, for deflecting the light from the light guide towards the polarization light splitter in a second predetermined direction substantially coinciding with a direction in which the polarization light splitter has a maximum polarization light splitting effect.

29 Claims, 5 Drawing Sheets

BACKLIGHT DEVICE AND LIQUID CRYSTAL DISPLAY DEVICE

This application claims the benefit of Japanese Patent Application No. 09-48563, filed in Japan on Feb. 18, 1997, and No. 09-215464, filed in Japan on Jul. 28, 1997, both of which are hereby incorporated by reference.

BACKGROUND OF THE INVENTION

1. Field of the Invention

The present invention relates to a backlight device and, more particularly, to a backlight device for use in liquid crystal display devices and the like.

2. Discussion of the Related Art

Recently, liquid crystal display (LCD) devices having a backlight system are becoming increasingly popular. The LCD devices modulate polarized light obtained by transmitting light through a polarizing plate through a liquid crystal layer.

FIG. 11 shows the typical structure of a conventional backlight system and an LCD device. Light emitted from light source 21 is incident on light guide 22 and propagates by undergoing multiple total internal reflections. A portion of the light traveling through the light guide 22 is diffused by light diffusers 23 and is emitted from the light guide. A portion of the light emitted downward from the light guide 22 is reflected by reflection sheet 24 and returned to the interior of the light guide 22. The light emitted upward from the light guide 22 is diffused by diffusion sheet 25, and is converged by prism sheet (or lens sheet) 26 to enter liquid crystal cell 30 interposed between polarizing plates 31 and 32.

FIGS. 12 and 13 show other types of conventional LCD devices having a backlight system.

The backlight device of FIG. 12 is structured such that the order of diffusion sheet 25 and prism sheet 26 is reversed from that of FIG. 11 and the prism surface of the prism sheet is facing the light guide 22.

The backlight of FIG. 13 is structured such that an additional prism sheet 26a, which has a plurality of triangular column prisms arranged in a direction perpendicular to the arrangement direction of the triangular column prisms in prism sheet 26, is placed over the prism the sheet 26.

However, currently used light polarizing plates absorb approximately half of the incident light, and thus have low efficiency in light usage. That is, in order to have sufficient luminance, more light needs be incident on the light polarizing plate. However, increasing the light intensity of the light source causes a variety of problems, such as increased power consumption of the light source and adverse effects on the liquid crystal due to heat generated from the light source, which degrade the display quality.

To solve these problems, the following techniques have been proposed. A polarization light splitter is provided for splitting unpolarized light from a light source into two linearly polarized light beams having the polarization directions orthogonal to each other. One of the split polarized light beams is directly used for illumination while the other polarized light beam is used indirectly. In other words, these techniques improve light usage efficiency such that, of the two linear polarization components of light, one component is incident on the liquid crystal cell, and the other component is reflected by the polarization light splitter, returned to the light source side, and is reflected again to reintroduce it to the polarization light splitter. Some of the recent developments along this direction are as follows.

(1) In Japanese Laid-Open Patent Application No. 04-184429, an unpolarized light beam from a light source is split by a polarization light splitter into two linearly polarized light beams having polarization directions orthogonal to each other. One of the polarized light beams is emitted directly towards the liquid crystal cell. The other is returned to the light source side, converged, and then is reflected for re-use as light for illuminating the liquid crystal cell.

(2) A backlight system disclosed in Japanese Laid-Open Patent Application No. 06-265892 has a beam deflector disposed over a planar light guide to direct light emitted from the planar light in a direction approximately perpendicular to the surface of the planar light guide. A polarization light splitter is located over the beam deflector.

(3) A backlight system disclosed in Japanese Laid-Open Patent Application No. 07-261122 has a polarization light splitter located on the light emitting surface side of a parallel light generating device, which is constructed of a light scattering guide that includes a portion having a wedge-shaped profile.

However, these conventional technologies have the following problems. The backlight system of (1) is intended for use with a projection LCD device. Since the structure of the illumination device requires a large amount of space, it cannot be applied for a planar thin LCD device.

The backlight system of (2) is suitable for constructing thin devices. With a polarization light splitter layer fabricated on the inclined sides of a columnar prism array having a plurality of triangular shaped elements, superior efficiency in light usage can be obtained. However, the structure of the polarization light splitter is complicated and, in particular, it is difficult to form the polarization light splitter layer on the inclined sides of the triangular shaped elements. Therefore, the device is not suitable for mass production.

In the technology (3), if the parallel light generating device of the light guide is constructed of a finely designed light scattering guide that includes a portion having a wedge-shaped profile, superior efficiency in light usage can be obtained. However, it is difficult to design and manufacture such a light scattering guide having the desired function. Therefore, this device is not convenient for general use.

SUMMARY OF THE INVENTION

Accordingly, the present invention is directed to a backlight device that substantially obviates the problems due to limitations and disadvantages of the related art.

An object of the present invention is to provide a backlight device that has a polarized light splitting film with a relatively simple, thin structure suitable for mass production and that has high efficiency in light usage.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight device of the present invention includes a light source; a light guide for receiving light from the light source at one end and for emitting directional light that has its maximum strength in a first predetermined direction; a polarization light splitter having a planar multi-layer structure; and a beam deflector disposed between the light guide and the polarization light splitter for deflecting the directional light from the light guide light towards the polarization light splitter in a second predetermined direction along which the polarization light splitter has its maximum polarized light splitting effect. As a result, the light usage efficiency from the light source can be improved. In addition, the polarization light splitter of the present invention has a planar shape suitable for manufacturing thin, compact backlight systems and LCD devices.

It is desirable to use a light guide having a plate-like shape. Light diffusing means may be provided in the light guide. Light diffusing means for the light guide may include a light diffusing layer that is in optical contact with the emitting surface of the light guide or formed by roughening the emitting surface or the opposite surface of the light guide. A light guide having light scattering (diffusing) property by itself may also be used as the light diffusing means. In addition, it is desirable that the light deflector be a prism sheet in which the cross-section of the surface facing the light guide and/or the cross-section of the surface opposite to the light guide side have an uneven surface profile formed by a plurality of unit prisms (or unit lenses). Furthermore, it is desirable to have a planar, multi-layer structure for the polarization light splitter in which three or more layers having different refractive indices are laminated. Also, it is desirable that the planar multi-layer structure of the polarization light splitter be constructed of three or more layers such that, with respect to two mutually orthogonal directions in a plane in which optical vibration occurs, the refractive index contrast of adjacent layers in one of the directions and the refractive index contrast of adjacent layers in the other one of the directions are different. Further, it is desirable that the polarization light splitter be constructed of an optical rotation selection layer made of a cholesteric liquid crystal layer and a quarter-wave layer ($\lambda/4$ layer).

An LCD device of the present invention has a structure such that the backlight system described above is used as the rear light source of the liquid crystal cell.

In another aspect, the present invention provides a backlight device including a light source for emitting light; a light guide for receiving the light from the light source and for emitting directional light having a maximum intensity in a first predetermined direction; a polarization light splitter having a planar, multi-layer structure; and a beam deflector, disposed between the light guide and the polarization light splitter, for deflecting the light from the light guide towards the polarization light splitter in a second predetermined direction substantially coinciding with a direction in which the polarization light splitter has a maximum polarization light splitting effect.

In another aspect, the present invention provides a liquid crystal display device including a light source for emitting light; a light guide for receiving the light from the light source and for emitting directional light having a maximum intensity in a first predetermined direction; a polarization light splitter having a planar, multi-layer structure; a beam deflector, disposed between the light guide and the polarization light splitter, for deflecting the light from the light guide towards the polarization light splitter in a second predetermined direction substantially coinciding with a direction in which the polarization light splitter has a maximum polarization light splitting effect such that the deflected light is transmitted through the polarization light splitter; and a liquid crystal cell for receiving the light transmitted through the polarization light splitter to display at least one image.

In a further aspect, the present invention provides a backlight device for use in a flat liquid crystal display device, the backlight device including a light source for emitting light; a light guide for receiving the light from the light source and for emitting directional light having a maximum intensity along a first predetermined direction; a light deflector, disposed over the light guide, for deflecting the directional light from the light guide in a second predetermined direction; and a polarization light splitter, disposed over the light deflector, having a light splitting effect depending on a direction of light incident thereon such that the polarization lights splitter splits the deflected light from the light deflector into two light beams having different polarization conditions with each other, the polarization light splitter reflecting one of the two light beams towards the light guide and transmitting the other one of the two light beams, and the light splitting effect being at a maximum in a direction substantially coinciding with the second predetermined direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
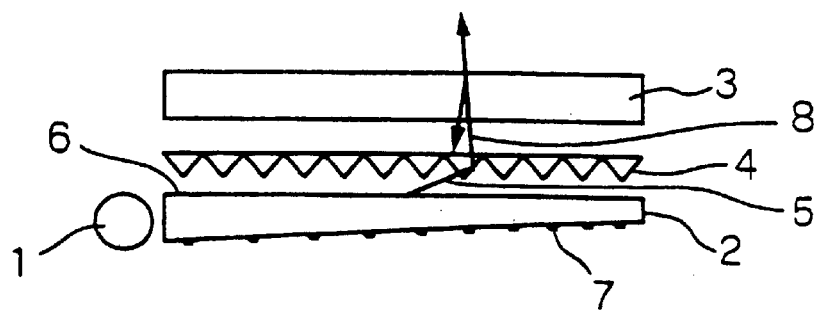
FIG. 1 is a cross-sectional view of a backlight system according to a preferred embodiment of the present invention.

FIG. 1 schematically shows a cross-sectional view of a backlight system according to a preferred embodiment of the present invention. The backlight device of the present invention includes a light source 1, and a light guide 2 for receiving light from the light source 1 and emitting directional light having its maximum intensity in a first predetermined direction. The backlight device further includes a polarization light splitter 3 having a planar, multi-layer structure, and a beam deflector 4 disposed between the light guide 2 and the polarization light splitter 3 for deflecting the directional light from the light guide 2 in a second predetermined direction in which the polarization light splitter 3 has its maximum polarization light splitting effect. A cold cathode tube can be used as the light source 1, for example.

The light guide 2 receives the light from the light source 1 at one end and emits the light from emitting surface 6. As shown in FIGS. 1 to 6, the light guide 2 emits directional light having its maximum intensity in the first predetermined direction indicated by the arrow 5 in the respective figures. The material of the light guide is not particularly limited, as long as it has efficient transmission capability. Examples of such a material include acrylic resins such as polymethyl meta acrylate (PMMA), polycarbonate resins, and glass. As shown in FIGS. 1 to 5, the first predetermined direction 5 is directed substantially opposite to light source 1 with respect to the emitting surface 6 of the light guide. The directional light that has its maximum intensity in the first predetermined direction 5 can be generated as diffused light (not fully diffused light, but with some directionality) by providing light scatterers (or light diffusers) for the light guide 2 and by configuring the light guide to have a plate-like shape (e.g., a wedge shape with its thickness decreasing towards the end opposite to the light source side). To form such light scatterers (diffusers), any one of the following methods or a combination of them can be used:

(1) Forming by a printing, or like method a light diffusing layer at the emitting surface 6 of the light guide to establish optical contact. In this method, a light diffusing (scattering) agent such as silica is dispersed in a resin to form the light diffusing layer.

Figure 2:
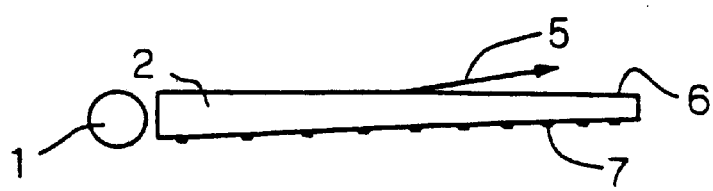
FIG. 2 is a cross-sectional view of a light guide according to a preferred embodiment of the present invention.

(2) Forming by printing, or like method, a light diffusing layer 7 (normally in a dot form), in which a light diffusing (scattering) agent such as silica is dispersed in a resin, at the surface opposite to the emitting surface of the light guide. In this method, optical contact is established between the light diffusing layer 7 and the light guide 2 (FIG. 2).

Figure 3:
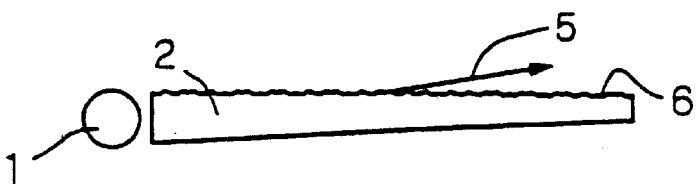
FIG. 3 is a cross-sectional view of a light guide according to another preferred embodiment of the present invention.

(3) Roughening the emitting surface 6 of the light guide 2 (FIG. 3).

Figure 4:
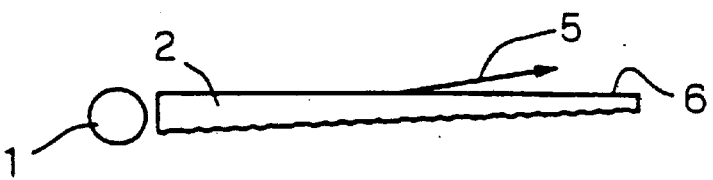
FIG. 4 is a cross-sectional view of a light guide according to another preferred embodiment of the present invention.

(4) Roughening the surface of the light guide 2 opposite to the emitting surface 6 (FIG. 4).

Figure 5:
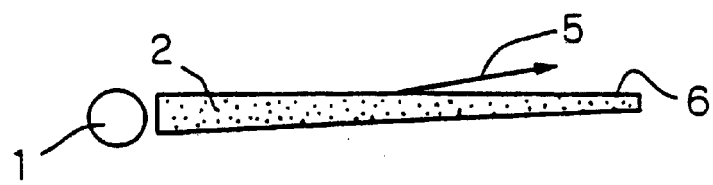
FIG. 5 is a cross-sectional view of a light guide according to another preferred embodiment of the present invention.

(5) Including in the light guide a plurality of small particles (preferably with a particle diameter of about 5 $\mu$m or less) made from a material having a refractive index different from that of the material of the light guide 2 (FIG. 5). For example, the particles may be made from silicon resin having a refractive index of 1.43, and the rest of the light guide may be made of PMMA having a refractive index of 1.49. The concentration of such particles is preferably less than 1 percent by weight. This way, the light guide itself can have a desired light diffusion (or scattering) property. If the particle diameter is greater than 5 $\mu$m, light emitted from the light guide becomes almost fully diffused light. If the concentration of the particle exceeds 1 percent by weight, the uniformity in the luminance at the emitting surface of the light guide deteriorates. Neither case is desirable.

Figure 6:
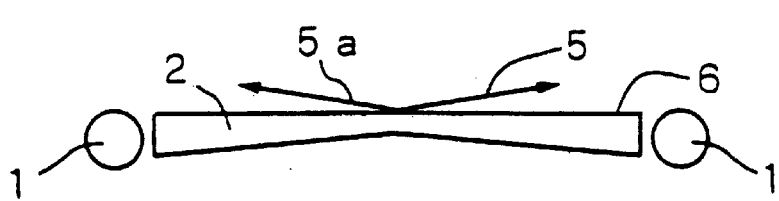
FIG. 6 is a cross-sectional view of a light guide according to another preferred embodiment of the present invention.

If a double-light-source structure is used together with a light guide tapering from wide to narrow in a direction away from the light source, the center portion of the light guide is made to be the thinnest, as shown in FIG. 6. In this construction, there are two first predetermined directions 5 and 5a.

Figure 7:
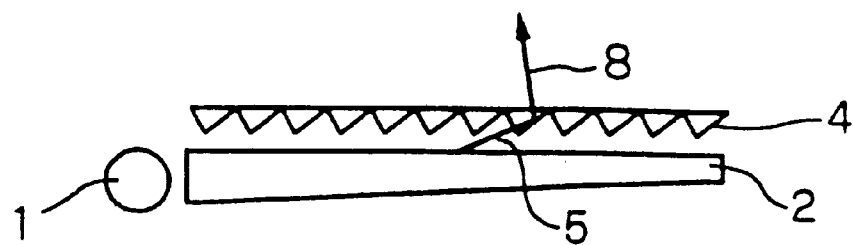
FIG. 7 is a cross-sectional view of a light deflector according to a preferred embodiment of the present invention.
Figure 8:
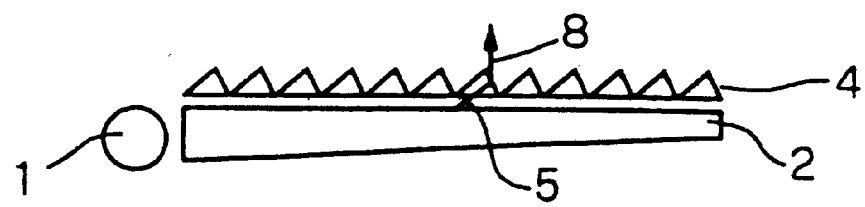
FIG. 8 is a cross-sectional view of a light deflector according to another preferred embodiment of the present invention.
Figure 9:
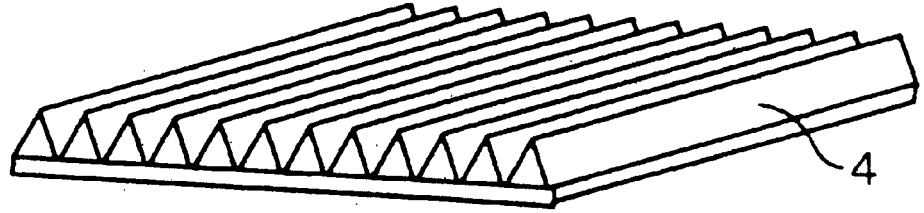
FIG. 9 is a perspective view of an example of the light deflector according to the present invention.

As shown in FIGS. 7 and 8, beam deflector 4 changes the direction of the light beam incident from light guide 2 in first predetermined direction 5, and emits it in a second predetermined direction 8. In the backlight system shown in FIG. 7, beam deflector 4 is a prism sheet (or lens sheet) that has a prism (or lens) structure created by arranging a plurality of unit prisms (or unit lenses). These unit prisms are triangular columns each having a triangular cross-section. The cross-section of the prism sheet at the surface facing the light guide 2 exhibits a jagged surface profile having a plurality of V-like-shape elements. In this case, when the beam emitted from the light guide in the first predetermined direction 5 is incident on the prism sheet 4, its direction changes into the second predetermined direction 8 by total internal reflection inside the prisms and the resultant beam is emitted from the prism sheet 4. In FIG. 7, the cross-section of each triangular column prism is a scalene triangle such that the side facing the light source has a steeper inclination than the side facing away from the light source. This structure of the beam deflector is adapted to change the direction of the directional light emitted obliquely from the emitting surface of the light guide 2 into a desired direction (second predetermined direction 8 in the figure), e.g., in the direction normal or substantially normal to the emitting surface of the light guide.

FIG. 8 shows another example of beam deflector 4 in a backlight system. The beam deflector of FIG. 8 is a prism sheet in which a plurality of triangular prisms each having a V-like-shape cross-section are disposed at the surface opposite to the light guide side (prism sheet 4 of FIG. 7 is turned upside down). The light beam incident from the light guide in the first predetermined direction 5 is deflected in a second predetermined direction 8 through refractions at the incident faces and the emitting faces of the prisms in beam deflector 4. In FIG. 8, the cross-section of each of the triangular column prisms is a scalene triangle in which the side facing away from the light source has a steeper inclination than the side facing the light source. The structure of the beam deflector is adapted to deflect the directional light obliquely emitted from the emitting surface of the light guide 2 into a desired direction (second predetermined direction 8 in the figure), in the direction of a normal line, for example. Alternatively, when the incident light has weak directionality, isosceles triangular prisms may be used instead.

The prism sheet functions properly as long as its constituent material has sufficient light transmissivity. Examples of material that can be used include polycarbonate (PC), polyester resins such as polyethylene terephtalate (PET), acrylic resins such as polymethyl meta acrylate (PMMA), and glass. In particular, to accurately form fine prism shapes, it is desirable to use an ultraviolet-setting resin on a base film formed from PET, PC, or the like for forming the prism sheets. Such prism sheets are desirable particularly because they have superior mass production capabilities. It is desirable to have a large refractive index for a prism formed with an ultraviolet-setting resin. The refractive index should be about 1.4 or larger or, more preferably, 1.5 or larger. To form the prism shape with an ultraviolet-setting resin on the base film, it is desirable to utilize a method disclosed in Japanese Laid-Open Patent Application No. 05-169015. In this publication, an ultraviolet-setting resin is coated on a rotating intaglio roll having a recessed pattern that is in reciprocal relationship with the uneven surface profile of the prism sheet to be manufactured, and a base film is pressed onto the intaglio roll over the resin solution thereon. Ultraviolet radiation is then irradiated on the intaglio roll and the resin is cured. The solidified ultraviolet-setting resin is peeled off from the rotating intaglio roll together with the base film. This way, the prism sheet can continuously be manufactured.

Figure 10:
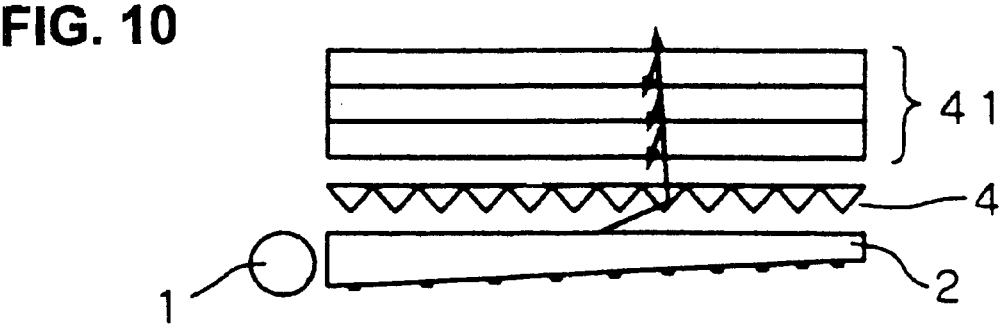
FIG. 10 is a cross-sectional view of a backlight system according to another preferred embodiment of the present invention.

For polarization light splitter 3 of the present invention, a planar, multi-layer structure is preferable. FIG. 10 shows a backlight system that uses polarization light splitter 41 with such a planar, multi-layer structure according to a preferred embodiment of the present invention.

The polarization light splitter 41 has a planar, multi-layer structure in which the materials of adjacent planar layers have different refraction indices. Material that can be used for the planar layer structure is not particularly limited as long as it has sufficient light transmission property. Examples of such a material include polyester resins such as polyethylene terephtalate (PET), polycarbonate (PC), acrylic resins such as polymethylmetaacrylate (PMMA), TAC (triacetate cellulose), glass, silica, and ITO (Indium Tin Oxide). The purpose of using such a polarization light splitter having a planar, multi-layer structure, with each layer having a different refraction index from its adjacent layer(s), is to utilize the phenomena that transmitted light and reflected light are polarized when a light beam passes through an interface between layers having different refractive indices (polarized light splitting effect). The incident angle of light where this polarized light splitting effect is optimized is known as Brewster's Angle. If the incident angle of light coincides with Brewster's Angle with respect to a planar layer with the refractive index n'>1 disposed in the air (refractive index n=1), the intensity contrast between the S wave of the reflected beam and the P wave of the transmitted beam becomes $T_S/T_P=2n'/(1+n'^2)$. In order to obtain a stronger polarized light splitting effect, the planar layer desirably has a multi-layer structure with two or more layers. It is more preferable to have a multi-layer structure with three or more layers. Having five or more layers is even better. Here, the P wave represents light with its optical vibration surface parallel to the incident surface and the S wave represents light with its optical vibration surface perpendicular to the incident surface.

When an unpolarized light beam is incident on this type of polarization light splitter, the linearly polarized components of the light beam that contain larger P wave components are transmitted. The remaining linearly polarized components of the light beam, which contain larger S wave components, are reflected towards the light guide side. The reflected light is linearly polarized light with the polarization plane orthogonal to that of the transmitted light. The light beam returned to the light guide is converted from a polarized state into an unpolarized state by scattering or reflection (this function is performed in the light guide, for example), and then emitted towards the polarization light splitter for re-use. Because the light beams eventually emitted from the light guide go through these processes, a desirable polarized light can efficiently be obtained with little loss of light quantity. Here, to convert reflected, polarized light beams into unpolarized light beams, a reflective sheet placed on the back side of the light guide may also be used.

As described above, one of the preferred embodiments of polarization light splitter 3 (41 in FIG. 10) of the present invention has a planar multi-layer structure constructed of two or more layers each having an isotropic predetermined refractive index. Alternatively, as shown in FIG. 16, it is possible to use a multi-layer structure in which a plurality of layers each having anisotropy in refractive index are laminated such that the primary axes of the anisotropy are shifted from each other.

The layers having anisotropy in refractive index can be formed of material having in-plane anisotropy in refractive index. Examples of such materials include, as disclosed in Japanese Laid-Open Patent Application No. 03-75705, polycarbonate system resins, polyester system resins, polyvinylalcohol system resins, and cellulose acetate system resins. A stretch method or the like can be used to form the corresponding layers.

Figure 16:
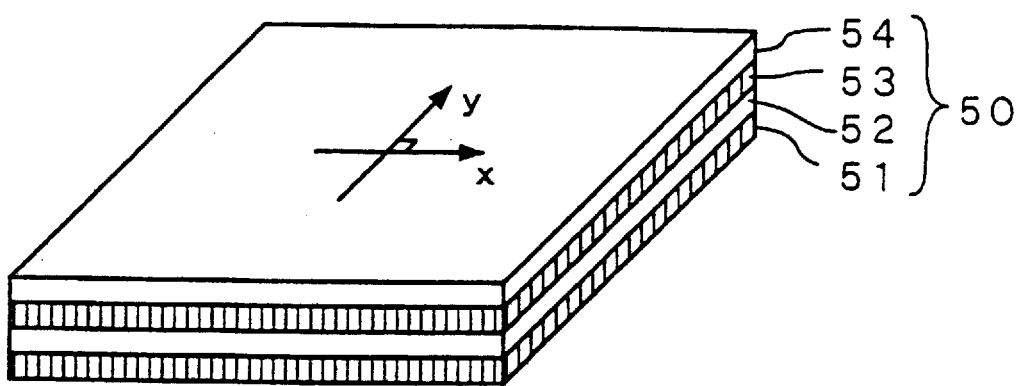
FIG. 16 is a perspective view of an example of a polarization light splitter having a planar multi-layer structure with anisotropic refractive indices according to the present invention.

FIG. 16 shows a perspective view of the multi-layer structure of a polarization light splitter 50. In FIG. 16, the planar, multi-layer structure of the polarization light splitter 50 is constructed of three or more layers in such a way that, with respect to two mutually orthogonal directions of optical vibrations in a plane, the refractive index contrast between adjacent layers along one of the directions is different from the refractive index contrast between adjacent layers along the other directions.

FIG. 16 schematically shows such a planar, multi-layer structure formed by laminating four layers 51–54 each having anisotropy in refractive index. For example, the refractive indices of layers 51, 52, 53 and 54 with respect to light vibrating in the X direction are designed to be substantially the same ($=n_x$). Therefore, there is no substantial difference in refractive index between adjacent layers in the X direction. On the other hand, the refractive indices of layers 51 and 53 with respect to light vibrating in the Y direction are both $n_{Y1}$, and the refractive indices of layers 52 and 54 with respect to light vibrating in the Y direction are both $n_{Y2}$ ($\neq n_{Y1}$). Therefore, the difference in the refractive index $\Delta n_Y=|n_{Y1}-n_{Y2}|$ between adjacent layers in the Y direction is substantially non-zero. Consequently, the refractive index difference $\Delta n_X$ in the X direction between adjacent layers and the refractive index difference $\Delta n_Y$ in the Y direction between adjacent layers are substantially different.

Polarization components of light are split using such a polarization light splitter having a planar, multi-layer structure in which the refractive index difference between adjacent layers along one of the two mutually orthogonal optical vibration directions is different from the refractive index difference between adjacent layers in the other direction. This separation of light components utilize the following properties. The reflection effect of light that vibrates in the direction of the high refraction index difference (Y direction in FIG. 16) is greater than the reflection effect of the light that vibrates in the direction of the low refraction index difference (X direction in FIG. 16). The transmission of light that vibrates in the direction of the low refraction index difference (X direction in FIG. 16) is greater than the transmission of light that vibrates in the direction of the high refraction index difference (Y direction in FIG. 16).

Furthermore, when the smaller refraction index difference is substantially zero, as in the case of the polarization light splitter of FIG. 16 above ($\Delta n_X$), light (or a light component) that vibrates along the corresponding direction is transmitted without reflection. With this construction, a superior light splitting effect can be achieved. In FIG. 16, light that vibrates in the X direction is transmitted and light that vibrates in the Y direction is reflected. Moreover, if the higher refractive index difference ($\Delta n_Y$ in the case of FIG. 16) is made larger, the performance of the polarized light splitting film can be further improved.

A mechanism for exhibiting these properties will be illustrated in the case of the polarization light splitter of FIG. 16. For the light vibrating in the X direction, the refractive indices inside the planar, multi-layer structure of the polarization light splitter 50 are substantially uniform. Therefore, only a small amount of surface reflection occurs on the incident surface and the emitting surface of the planar, multi-layer structure. However, for the light vibrating in the Y direction, the refractive indices inside the planar multi-layer structure are different from respective adjacent layers. Therefore, surface/interface reflections occur at each of the interfaces between the layers as well as at the incident surface and the emitting surface of the planar multi-layer structure. The greater the number of layers in the polarization light splitter is, the more reflections occur, improving efficiency in reflection of the light vibrating in the Y direction.

In this case, the optimum incident direction of light for producing the maximum polarized light splitting effect is around a direction normal to the plane of the planar, multi-layer structure.

To measure the polarization light splitting effect, linearly polarized light beams having the polarization directions orthogonal to each other can be used.

Instead of using materials having anisotropy in refractive index, liquid crystal, preferably cholesteric liquid crystal material, can also be used to form the polarization light splitting member in the planar, multi-layer structure of the polarization light splitter of the present invention. Cholesteric liquid crystal exhibits an optical rotation selectivity due to its helical molecular structure. The light incident at an angle parallel to the helical axis of the planar structure is split into two circularly polarized light beams: right and left (clockwise or counterclockwise) circularly polarized components. One of the components is transmitted and the other is reflected. This phenomena is known as circular dichroism. When the optical rotation direction of the circularly polarized components of the incident light is properly oriented, the circularly polarized component that has the same orientation as the helical axis of the cholesteric liquid crystal is selectively scattered and reflected. The maximum scattering of these optically rotated beams occurs at the wavelength $\lambda_0$ given by the following Equation (1).

$$\lambda_0 = n_{AV} p \quad (1)$$

Here, p represents the helical pitch, and $n_{AV}$ represents an average refractive index in a plane perpendicular to the helical axis. The wavelength bandwidth $\Delta\lambda$ of the reflective light is given in the following Equation (2).

$$\Delta\lambda = \Delta n \cdot p \quad (2)$$

Here, $\Delta n = n\| - n\perp$, $n\|$ is the maximum refractive index in a plane perpendicular to the helical axis, and $n\perp$ is the maximum refractive index in a plane parallel to the helical axis. Also, it is known that the wavelength $\lambda\psi$ of the selectively reflected light separated from light that is obliquely incident with respect to the helical axis of the planar structure shifts towards the shorter wavelength side relative to $\lambda_0$.

Using the above-mentioned properties, it is possible to selectively use light that has a specific wavelength. Alternatively, white light can be used by adjusting the helical pitch p and the refractive index difference $\Delta n$ of the cholesteric liquid crystal so that the wavelength bandwidth $\Delta\lambda$ of the reflected light covers the entire range of visible light.

The cholesteric liquid crystal is preferably chiral nematic liquid crystal in which optically active material, such as a 2-methylbutyl group, a 2-methylbutoxy group, or a 4-methylhexyl group, is bonded on the end group of a nematic liquid crystal compound, such as a schiff base, azo system, ester system, or biphenyl system.

Moreover, materials suitable for the cholesteric liquid crystal include cholesteric liquid crystal polymers. The cholesteric liquid crystal polymer is preferable because it is in a solid phase at a room temperature and its chiral characteristics are easily maintained. In general, a liquid crystal polymer has a mesogen group that exhibits liquid crystal character introduced in the main chain and/or the side chain of the polymer. Similarly, a liquid cholesteric crystal polymer can be obtained by introducing a cholesteril group to the side chain, for example. In this case, the cholesteril group can be introduced to the side chain of a main chain polymer of polysiloxane or a vinyl polymer such as an ethylene-vinyl acetate copolymer, through a spacer (molecular) that provides an appropriate distance, or by polymerizing a vinyl monomer having a cholesteril group, for example.

The polarization light splitting effect of the cholesteric liquid crystal is such that one of the circularly polarized light components (right rotated or left rotated) is transmitted and the other circularly polarized light component is reflected at the cholesteric liquid crystal. For an LCD, linearly polarized light (not circularly polarized light) is normally used as incident light. Therefore, it is preferable to use a quarter-wave plate ($\lambda/4$ phase differentiation plate) that converts circularly polarized light to linearly polarized light. The functions of the cholesteric liquid crystal and the quarter-wave plate are reported in "SID 90 DIGEST, pp. 110–113; Polarizing Color Filters Made From Cholesteric LC siliconer," for example.

When cholesteric liquid crystal is used, the cholesteric liquid crystal layer and the quarter-wave layer may be in contact with each other or may be separated by air or by an additional layer interposed therebetween. However, it is preferable to couple both layers to be in contact with each other and to create a planar, multi-layer structure having at least two layers. This is because the resultant polarization light splitter can be made film-like. The quarter-wave layer is arranged at the liquid crystal cell side and the cholesteric liquid crystal layer is arranged at the light guide side. In principle, it is possible to have the cholesteric liquid crystal layer and the quarter-wave layer disposed separately from each other. However, such arrangement is not particularly preferable because there will be a loss in light quantity due to reflections at the interfaces between the solid and the gas, and the arrangement will require more constituent parts.

The optimum incident angle of light for producing the maximum polarized light splitting effect at the cholesteric liquid crystal layer depends on the orientation of the cholesteric liquid crystal. In view of the envisioned application to LCD devices, it is most desirable to align the orientation of the cholesteric liquid crystal such that the maximum strength of the polarized light occurs in a direction substantially normal to the plane of the planar polarization light splitter. The desired orientation of the cholesteric liquid crystal can be obtain by using a rubbing method in which the cholesteric liquid crystal is coated on a rubbed substrate of a polymer film, or by using an ultraviolet orientation technology with a polarized beam.

When the polarization light splitting effect of cholesteric liquid crystal is used, as described above, the polarization light splitting effect due to the Brewster's angle at the interfaces of the cholesteric liquid crystal layers, and the polarization light splitting effect of the cholesteric liquid crystal itself, are combined. Each effect has its own optimum direction in which the effect becomes the strongest. When the two directions are significantly different, the total light splitting property has merely two peaks. However, when the two directions are close to each other, the total light splitting effect is enhanced. Normally, this direction coincides with the direction of the helical axis of the cholesteric structure.

As described above, the backlight system of the present invention has a light deflector for deflecting directional light (e.g., directionally diffused light) with the maximum strength in the first predetermined direction emitted from the light guide towards the second predetermined direction (the direction in which the polarized light splitting effect of the polarization light splitter described above reaches its maximum). As a result, it is possible to significantly improve efficiency in light usage using the maximum polarization light splitting ability of the polarization light splitter. In addition, since the polarization light splitter of the present invention has a planar structure, it becomes possible to manufacture a thin, compact backlight system, as compared with conventional structures in which the multi-layer structure is formed on inclined faces.

Figure 11:
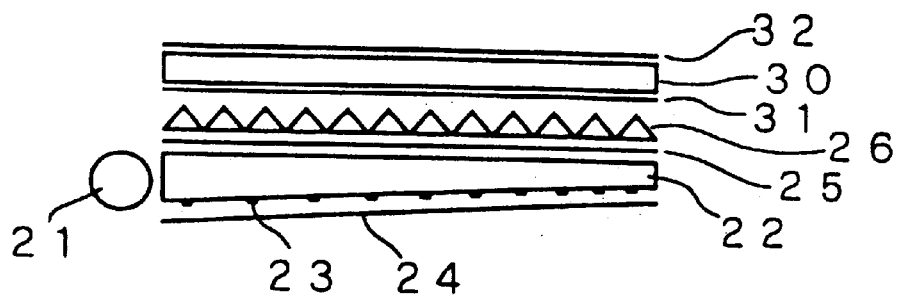
FIG. 11 is a cross-sectional view of a conventional backlight system with a liquid crystal cell.
Figure 12:
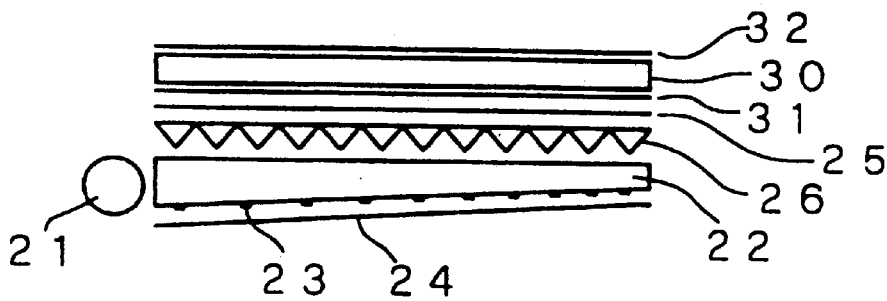
FIG. 12 is a cross-sectional view of another conventional backlight system with a liquid crystal cell.
Figure 13:
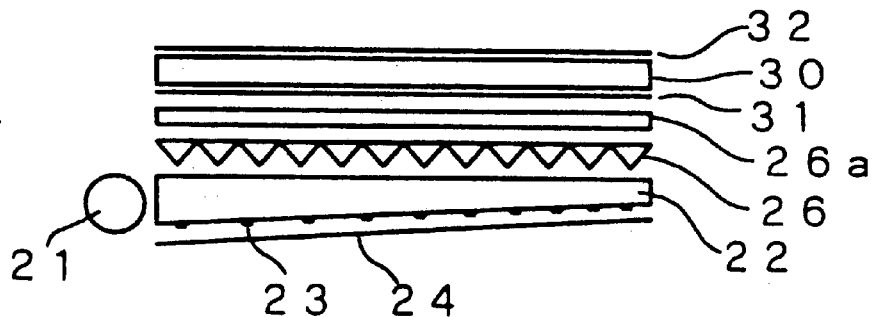
FIG. 13 is a cross-sectional view of still another conventional backlight system with a liquid crystal cell.

The backlight system of the present invention may include a diffusion sheet and/or prism sheet (or lens sheet), as in the conventional backlight systems of FIGS. 11 to 13.

In addition, an LCD device of the present invention includes the backlight system of the present invention as a rear lighting source for illuminating the liquid crystal cell.

The present invention is described further by working examples and comparative examples, as follows.

First Working Example

Figure 14:
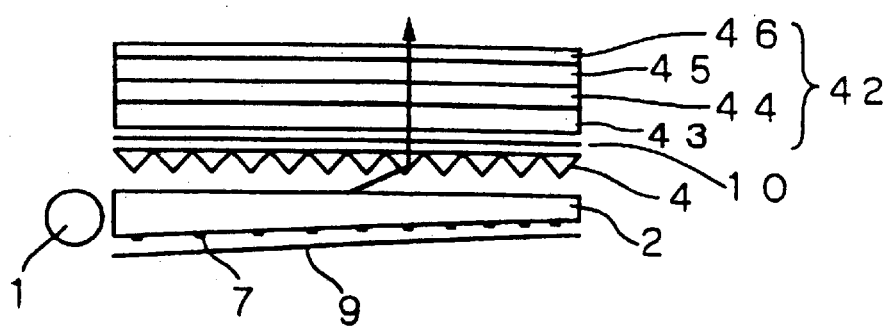
FIG. 14 is a cross-sectional view of a backlight system having a multi-layer polarization structure made of cholesteric liquid crystal according to a first working example of the present invention.

FIG. 14 shows a backlight system according to a first working example of the present invention. The backlight system includes light source 1 for emitting light, and light guide 2 having dot-shape light diffusers 7 on its bottom surface for emitting diffused light having a maximum strength in an oblique direction. The backlight system further includes a planar, multi-layered polarization light splitter 42 constructed of, from the incident surface side, PET (polyethleneterephtalate resin) layer 43, cholesteric liquid crystal layer 44 (the direction of the helical axis of the cholesteric structure is normal to the PET layer surface), quarter-wave layer 45, and TAC (triacetate cellulose) layer 46.

Beam deflector 4 was provided for deflecting light from the light guide 2. The beam deflector 4 is a prism sheet having a plurality of prism (or lens) units disposed thereon. Each of the prism units is a triangular column prism having a scalene triangle cross-section in which the side facing the light source 1 has a steeper inclination than the side facing away from the light source. The jagged surface of the prism sheet faces the light guide side.

In this backlight system, reflection sheet 9 was made of a white polyethylene terephtalate sheet and located adjacent to the bottom surface of the light guide 2. Diffusion sheet 10 with a weak diffusion capability was arranged between the beam deflector 4 and the polarization light splitter 42. The polarization direction of a polarizer disposed on a light receiving side of a liquid crystal cell (not shown in the figure) was aligned with the polarization direction of the light emitted through the polarization light splitter 42 so that the polarized light can be utilized at the maximum efficiency.

The light beam from the light source 1 propagated in light guide 2 by experiencing multiple total internal reflections and was emitted upwards from the light guide 2 in an oblique direction. Such emitted light beam was deflected upwards through total internal reflection at the prisms of the light deflector 4, transmitted through polarization light splitter 42, and was incident on a liquid crystal panel having twisted nematic (TN) type liquid crystal interposed between two polarizing plates.

The luminance of light emitted from the polarizing plate on the liquid crystal panel surface was measured in the transmission mode of the liquid crystal panel. The result was compared to the liquid crystal panel with the conventional backlight system of FIG. 11. The maximum luminance (luminance in the direction of the maximum value) was improved by 40%. The total thickness of the backlight system is 6 mm, which is 1/10 or less of the total thickness of a conventional direct-bottom-type backlight system.

Second Working Example

The backlight of a second working example was prepared in a similar manner to the first working example except that, in the backlight system, a triangular column prism having an isosceles triangular cross-section with a vertical angle of 90 degree was used as the prism unit of the beam deflector and the uneven surface of the prism sheet was arranged at the side opposite to the liquid crystal cell side. The luminance was evaluated in the same way as in the first working example. The maximum luminance was improved by 20%.

First Comparative Example

A backlight system was prepared using the same polarization light splitter as that of the second working example, but was arranged to have the polarization light splitter and the prism sheet (the prism surface is facing the liquid crystal cell side) in that order from the light guide side. The luminance was evaluated in the same manner as in the first working example. The maximum luminance was not significantly improved. That is, there was only 5% improvement.

Third Working Example

Figure 15:
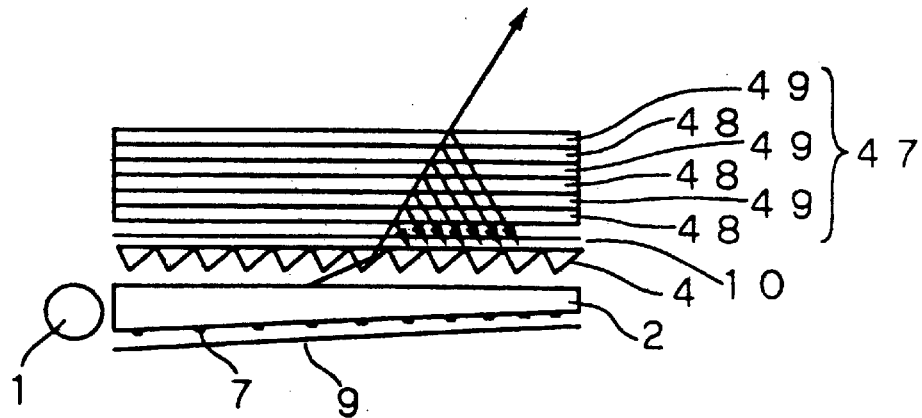
FIG. 15 is a cross-sectional view of a backlight system having a multi-layer polarization structure that utilizes the Brewster's angle (Brewster's law) according to a third working example of the present invention.

As shown in FIG. 15, a backlight of a third working example was prepared using a polarization light splitter 47 having a planar, multi-layer structure with a total of 50 layers of alternately laminated polycarbonate resin layers 48 and polymetylmetacrylate resin layers 49. The other parts were the same as in the first working example. The luminance was evaluated in the same manner as in the first working example. The maximum luminance was improved by 60%.

Fourth Working Example

In a fourth working example, instead of using the polarization light splitter of the first and second working examples above, a polarization light splitter was constructed by laminating, through a thermal-press process, a total of 100 layers of polyester resin layers each stretched in a predetermined direction as in a manner similar to the polarization light splitter of FIG. 16. The laminated structure was formed such that the primary axes of the respective refractive indices in adjacent layers are perpendicular to each other. The measured luminance exhibited improvements similar to the first and second working examples above.

Second Comparative Example

The luminance was measured for each of the first to fourth working examples above under the condition that the direction in which the maximum intensity of the directional light incident on the corresponding polarization light splitter is deliberately shifted from the optimum direction in which the maximum polarization light splitting effect occurs in the polarization light splitter. The measurement results showed that the greater the shift, the lower the luminance. In particular, a significant reduction in the luminance was observed in the case of a 10 degree shift. With a 25 degree shift, changes in color were clearly observed.

According to the present invention, efficiency in light usage can be improved with a relatively simple structure. In addition, the polarization light splitter of the present invention has a thin, planar shape, and therefore is suitable for manufacturing thin, compact liquid crystal devices.

It will be apparent to those skilled in the art that various modifications and variations can be made in the backlight device of the present invention without departing from the spirit or scope of the invention. Thus, it is intended that the present invention cover modifications and variations of this invention provided they come within the scope of the appended claims and their equivalents.

What is claimed is:

1. A backlight device comprising:

a light source for emitting light;

a light guide for receiving the light from the light source and for emitting directional light having a maximum intensity in a first direction, the directional light being emitted at the maximum intensity as directionally diffused light by a light diffusing surface provided on at least one side of the light guide;

a polarization light splitter having a planar, multi-layer structure, wherein each of the multiple layers constituting the polarization light splitter is in planar form over its entirety and the multiple layers of the polarization light splitter are configured for light passing through at an angle; and a beam deflector, disposed between the light guide and the polarization light splitter, for deflecting the directional light from the light guide towards the polarization light splitter in a second direction substantially coinciding with a direction in which the polarization light splitter has a maximum polarization light splitting effect, the second direction being not in parallel with the first direction.

2. The backlight device according to claim 1, wherein the planar, multi-layer structure of the polarization light splitter includes at least three laminated layers each having a refractive index different from that of each layer adjacent to it.

3. The backlight device according to claim 1, wherein the polarization light splitter includes an optical rotation selection layer made of a cholesteric liquid crystal layer and a quarter-wave layer.

4. The backlight device according to claim 1, wherein the planar, multi-layer structure of the polarization light splitter includes at least three layers each having anisotropy in refractive index arranged such that a value indicating a difference in refractive index along one of two mutually orthogonal optical vibration directions in a predetermined plane between two adjacent layers is different from a value indicating a difference in refractive index along the other one of the two mutually orthogonal optical vibration directions between the two adjacent layers.

5. The backlight device according to claim 1, wherein the light guide has a plate-like shape and has an exit surface from which the directional light is emitted, and wherein the light diffusing surface of the light guide includes a light diffusing layer optically in contact with at least one of the exit surface and a surface opposing thereto of the light guide.

6. The backlight device according to claim 1, wherein the light guide has a plate-like shape and has an exit surface from which the directional light is emitted, and wherein at least one of the exit surface and a surface opposing thereto of the light guide has an uneven surface profile functioning as the light diffusing surface.

7. The backlight device according to claim 1, wherein the light guide includes light scattering agents in its interior.

8. The backlight device according to claim 1, wherein the beam deflector has at least two sides, one of the sides facing towards the light guide and the other side facing away from the light guide; and wherein the beam deflector includes a prism sheet having a plurality of unit prisms, disposed at least one of the sides of the beam deflector, to form a jagged surface profile of the beam deflector.

9. The backlight device according to claim 8, wherein the polarization light splitter includes an optical rotation selection layer made of a cholesteric liquid crystal layer, and a quarter-wave layer.

10. The backlight device according to claim 8, wherein the planar, multi-layer structure of the polarization light splitter includes at least three layers each having anisotropy in refractive index arranged such that a value indicating a difference in refractive index along one of two mutually orthogonal optical vibration directions in a predetermined plane between two adjacent layers is different from a value indicating a difference in refractive index along the other one of the two mutually orthogonal optical vibration directions between the two adjacent layers.

11. The backlight device according to claim 8, wherein the planar, multi-layer structure of the polarization light splitter includes at least three laminated layers each having a refractive index different from that of each layer adjacent to it.

12. The backlight device according to claim 1, wherein the light guide generates directional diffused light having the maximum intensity in the first predetermined direction.

13. The backlight device according to claim 1, wherein the beam deflector is a prism sheet.

14. The backlight device according to claim 13, wherein a cross-section of each prism in the prism sheet is a scalene or isosceles triangular.

15. A liquid crystal display device comprising:

a light source for emitting light;

a light guide for receiving the light from the light source and for emitting directional light having a maximum intensity in a first direction, the directional light being emitted at the maximum intensity as directionally diffused light by a light diffusing surface provided on at least one side of the light guide;

a polarization light splitter having a planar, multi-layer structure, wherein each of the multiple layers constituting the polarization light splitter is in planar form over its entirety and the multiple layers of the polarization light splitter are configured for light passing through at an angle;

a beam deflector, disposed between the light guide and the polarization light splitter, for deflecting the directional light from the light guide towards the polarization light splitter in a second direction substantially coinciding with a direction in which the polarization light splitter has a maximum polarization light splitting effect such that the deflected light is transmitted through the polarization light splitter, the second direction being not in parallel with the first direction; and a liquid crystal cell for receiving the light transmitted through the polarization light splitter to display at least one image.

16. The liquid crystal display device according to claim 15, wherein the planar, multi-layer structure of the polarization light splitter includes at least three laminated layers each having a refractive index different from that of each layer adjacent to it.

17. The liquid crystal display device according to claim 15, wherein the polarization light splitter includes an optical rotation selection layer made of a cholesteric liquid crystal layer and a quarter-wave layer.

18. The liquid crystal display device according to claim 15, wherein the planar, multi-layer structure of the polarization light splitter includes at least three layers each having anisotropy in refractive index arranged such that a value indicating a difference in refractive index along one of two mutually orthogonal optical vibration directions in a predetermined plane between two adjacent layers is different from a value indicating a difference in refractive index along the other one of the two mutually orthogonal optical vibration directions between the two adjacent layers.

19. The liquid crystal display device according to claim 15, wherein the light guide has a plate-like shape and has an exit surface from which the directional light is emitted, and wherein the light diffusing surface of the light guide includes a light diffusing layer optically in contact with at least one of the exit surface and a surface opposing thereto of the light guide.

20. The liquid crystal display device according to claim 15, wherein the light guide has a plate-like shape and has an exit surface from which the directional light is emitted, and wherein at least one of the exit surface and a surface opposing thereto of the light guide has an uneven surface profile functioning as the light diffusing surface.

21. The liquid crystal display device according to claim 15, wherein the light guide includes light scattering agents in its interior.

22. A backlight device for use in a flat liquid crystal display device, the backlight device comprising:

a light source for emitting light;

a light guide for receiving the light from the light source and for emitting directional light having a maximum intensity in a first direction, the directional light being emitted at the maximum intensity as directionally diffused light by a light diffusing surface provided on at least one side of the light guide;

a light deflector, disposed over the light guide, for deflecting the directional light from the light guide in a second direction that is not in parallel with the first direction; and a polarization light splitter, disposed over the light deflector, having a light splitting effect depending on a direction of light incident thereon such that the polarization light splitter splits the deflected light from the light deflector into two light beams having different polarization conditions with each other, the polarization light splitter reflecting one of the two light beams towards the light guide and transmitting the other one of the two light beams, and the light splitting effect being at a maximum in a direction substantially coinciding with the second direction, the polarization light splitter including a plurality of layers each of which is in planar form over its entirety, the plurality of layers of the polarization light splitter are configured for light passing through at an angle.

23. The backlight device according to claim 22, wherein the polarization light splitter includes a plurality of laminated layers each having a refractive index different from that of each layer adjacent to it.

24. The backlight device according to claim 22, wherein the polarization light splitter includes an optical rotation selection layer made of a cholesteric liquid crystal layer and a quarter-wave layer.

25. The backlight device according to claim 22, wherein the polarization light splitter includes at least three layers each having anisotropy in refractive index arranged such that a value indicating a difference in refractive index along one of two mutually orthogonal optical vibration directions in a predetermined plane between two adjacent layers is different from a value indicating a difference in refractive index along the other one of the two mutually orthogonal optical vibration directions between the two adjacent layers.

26. The backlight device according to claim 22, further comprising a reflection sheet disposed under the light guide for reflecting light that is emitted downwards from the light guide to return the light to the light guide.

27. The backlight device according to claim 22, wherein the light guide has a plate-like shape and has an exit surface from which the directional light is emitted, and wherein the light diffusing surface of the light guide includes a light diffusing layer optically in contact with at least one of the exit surface and a surface opposing thereto of the light guide.

28. The backlight device according to claim 22, wherein the light guide has a plate-like shape and has an exit surface from which the directional light is emitted, and wherein at least one of the exit surface and a surface opposing thereto of the light guide has an uneven surface profile functioning as the light diffusing surface.

29. The backlight device according to claim 22, wherein the light guide includes light scattering agents in its interior.

* * * * *